Oct. 24, 1944.  N. B. STONE  2,361,330
TIRE RETAINING RING
Filed Dec. 22, 1941
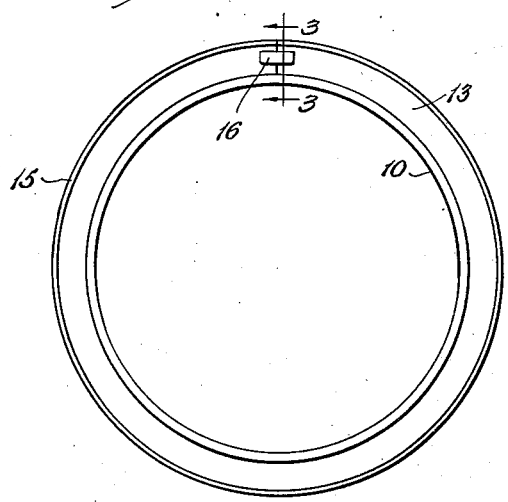
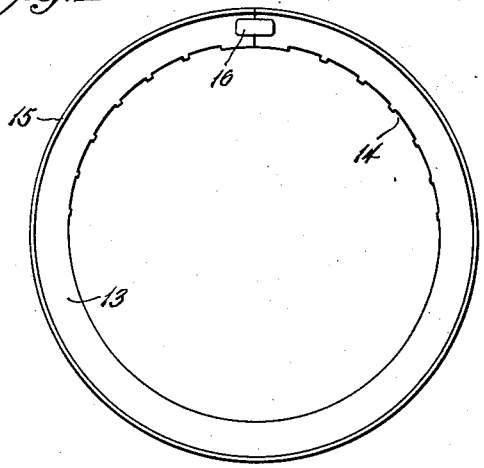
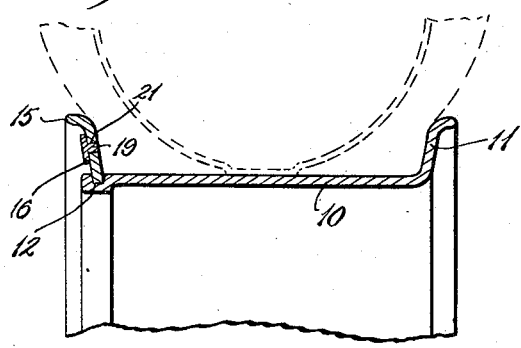
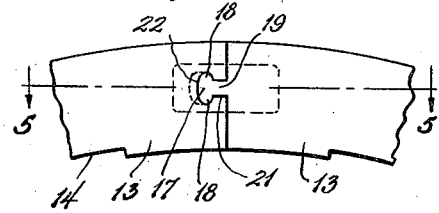
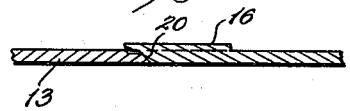
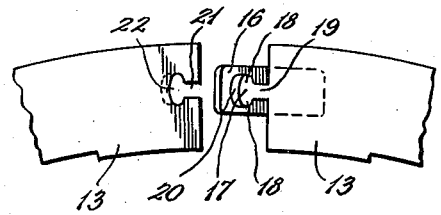
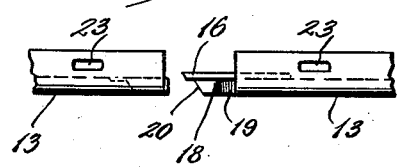
Inventor
N. B. Stone
By A. D. Adams
Attorney Patented Oct. 24, 1944

2,361,330

UNITED STATES PATENT OFFICE 2,361,330

TIRE RETAINING RING

Nathaniel B. Stone, Washington D. C.

Application December 22, 1941, Serial No. 424,063

2 Claims. (Cl. 152—407)

This invention relates to tire retaining rings for automobile wheel rims and, among other objects, aims to provide a greatly improved self-locking flange ring which can easily be removed from and inserted on a wheel rim and which cannot be accidentally unlocked. Another aim is to provide an improved locking ring of the general type shown in U. S. Patent No. 2,178,502 having an integral locking member or detent on the outside of the ring flange at one terminal coacting with an opening provided in the other terminal of the ring flange, the terminals being laterally spring-biased to cause the lock to snap into engagement when the ring is contracted.

Other aims and advantages of the invention will appear in the specification, when considered in connection with the accompanying drawing, wherein:

Fig. 1 is a side elevation of a wheel rim having a locking ring embodying the invention applied thereto;

Fig. 2 is a side elevation of the locking ring;

Fig. 3 is a fragmentary sectional view taken on the line 3—3 of Fig. 1;

Fig. 4 is an enlarged fragmentary rear face view of the lock joint of the ring;

Fig. 5 is a sectional view taken on the line 5—5 of Fig. 4;

Fig. 6 is a view similar to Fig. 4 showing the ring unlocked; and

Fig. 7 is a top edge view of Fig. 6.

Referring particularly to the drawing, the improved self-locking expansible ring is shown as being applied to an ordinary automobile wheel rim 10 having the usual integral rear flange 11 and a front ring receiving groove 12. The ring, in this instance, is somewhat similar to that shown in my aforesaid Patent 2,178,502, having a vertical annular flange 13 provided with graduated notches 14 to give it the desired uniform spring strength. It also has a flared outwardly bent edge 15 like the edge of the flange portion 11.

In the aforesaid patent the locking ring is shown as having a special type of latch member which necessitates the assembly of several parts, including a spring element to bias the latch element into locking engagement with an opening. Experience has demonstrated that such separate latch elements are subject to breakage, wear and displacement. In accordance with the present invention, no separate latch elements are necessary. In the illustrated example, the terminals of the ring are provided with coacting locking members. The main locking element is shown as being in the form of a detent or locking lug preferably brazed or welded on the outer face of one terminal of the ring. It may be and preferably is in the form of a metal plate 16 welded on the flange 13 intermediate its upper and lower edges and it has a detent or locking lug 17 providing double locking hooks, 18 being shown in Figs. 4 and 6 as generally T-shaped with a stem 19 of the same thickness as that of the ring flange 13. The detent is shown as having a tapered or beveled nose portion 20 which is shaped to ride over a throat or slot 21 in the opposite terminal which leads to a locking opening 22 in the terminal shaped substantially to conform with the shape of the detent 17 and to permit the detent to snap into it with its inner face and the face of the stem substantially flush with the ring flange 13. Referring to Figs. 4 and 6, it will be noted that the locking slot or opening 22 is tapered from the outer face inwardly, being smaller on the inner face of the ring flange and thus presenting only a small surface of the locking detent to contact with the side wall of the tire bead.

In the manufacture of such locking rings, the flange at the terminals is usually made slightly thicker than it is around the other portions of the ring. This balances the weight of the ring and affords ample metal on which to cut the locking opening. The terminals are also spring-biased so that the flared forward end of the plate 16 will always contact the outer face of the flange 13 of the opposite terminal and thus will tend to snap the detent into locking engagement. Incidentally, the leading end portion of the plate 16 is shown in Fig. 5 as being slightly beveled to permit the insertion of a knife blade or screwdriver to spring the ring terminals apart to disengage the lock. It will be understood that the normal spring tension of the ring tends to open the gap slightly at the joint, so that, when the detent is released, the ring can be expanded for removal.

To lock the ring on the rim, it is preferably engaged by a tool of the type shown in my Patent 2,237,201, the hooked ends of which are inserted through openings 23 in the flared portion 15 of the ring. The bottom portion of the ring flange is guided into the rim groove 12 after the tire is placed on the rim and the tool contracts the ring to the position shown in Figs. 1, 2 and 4, so that the detent snaps into place in the locking opening 22. To unlock the ring, the tool is again engaged in the notches 23 with pressure applied to it and the forward lip of the plate 16 is pried outwardly by a screwdriver or other convenient implement to disengage the detent from the groove 22. Then the ring is expanded and slipped out of its groove in the rim.

From the foregoing description, it will be seen that the improved ring lock is practically foolproof and dustproof. It cannot be accidentally unlocked due to jars or vibrations. It has no sharp edges which will damage a tire casing. It is strong and durable and not subject to easy breakage or displacement. In fact, it is a permanent part of the ring.

Obviously, the present invention is not restricted to the particular embodiment thereof herein shown and described except as defined in the appended claims.

What is claimed is:

1. In combination with a self-latching, split spring tire retaining ring having a flange portion and adapted to be secured on a wheel rim, a plate member rigidly secured to the outer face of one terminal of the flange portion intermediate its edges; a locking detent on the inner side of the plate member integral with and extending beyond the terminal of the flange portion and adapted to override the outer face of the opposite flange terminal, said plate covering and protecting the outer face of the detent, said opposite flange portion having a detent receiving notch into which the detent is normally spring urged by the spring action of the ring to snap into its latching position; and said detent having a beveled edge portion adapted to guide it toward its latching position when the ring is contracted.

2. In combination with a split, spring retaining ring having a tire-engaging flange, a detent member integral with one terminal of the ring and being generally T-shaped with a beveled forward end adapted to slide over the outer face of the other terminal of the ring; a reinforcing cover plate for the detent on the outer face of the rim flange said other terminal of the ring having a generally T-shaped slot extending through its terminal edge and being flared outwardly to guide the detent into latching engagement with said slot when the ring is contracted; and the terminal portions of the ring having notches to receive an expanding and contracting tool.

NATHANIEL B. STONE.